United States Patent
Guyette et al.

(10) Patent No.: US 9,964,648 B2
(45) Date of Patent: May 8, 2018

(54) GUIDIANCE SYSTEM AND METHOD BASED ON DEAD RECKONING POSITIONING AND HEADING AUGMENTED BY GNSS AND PREDICTIVE PATH SELECTION

(71) Applicant: Insero LLC, Tempe, AZ (US)

(72) Inventors: Greg Guyette, Tempe, AZ (US); Aaron Stichter, Mesa, AZ (US)

( * ) Notice: Subject to any disclaimer, the term of this patent is extended or adjusted under 35 U.S.C. 154(b) by 0 days. days.

(21) Appl. No.: 15/173,886

(22) Filed: Jun. 6, 2016

(65) Prior Publication Data

US 2016/0366815 A1    Dec. 22, 2016

Related U.S. Application Data

(60) Provisional application No. 62/180,521, filed on Jun. 16, 2015.

(51) Int. Cl.

| | | |
|---|---|---|
| *G01S 19/49* | (2010.01) | |
| *G01C 21/16* | (2006.01) | |
| *A01C 21/00* | (2006.01) | |
| *A01B 69/00* | (2006.01) | |

(52) U.S. Cl.
CPC ............ *G01S 19/49* (2013.01); *A01B 69/007* (2013.01); *A01C 21/005* (2013.01); *G01C 21/165* (2013.01)

(58) Field of Classification Search
None
See application file for complete search history.

(56) References Cited

U.S. PATENT DOCUMENTS

| | | | | |
|---|---|---|---|---|
| 2008/0167770 A1* | 7/2008 | Macdonald | .......... | A01B 69/008 701/24 |
| 2010/0030470 A1* | 2/2010 | Wang | ...................... | G01S 19/49 701/472 |
| 2011/0231061 A1* | 9/2011 | Reeve | .................. | A01B 69/008 701/41 |
| 2012/0215410 A1* | 8/2012 | McClure | .............. | A01B 79/005 701/50 |
| 2013/0325242 A1* | 12/2013 | Cavender-Bares | .. | A01C 21/002 701/25 |
| 2015/0201549 A1* | 7/2015 | Baurer | ................... | A01C 7/105 111/171 |

* cited by examiner

*Primary Examiner* — Rodney A Butler
*Assistant Examiner* — Tamara L Weber
(74) *Attorney, Agent, or Firm* — Venjuris P.C.; Michael F. Campillo

(57) ABSTRACT

A robust system and method for positioning and heading for guidance or logging agricultural input placement amounts and locations is disclosed and can be used to aid or direct treatment of a field that has only partial or temporary access to a reliable GNSS signal. The guidance information or data can be stored in memory and output to a video display terminal or the visual display of a computing unit (e.g. laptop or user mobile phone) or alternative formatted or translated to produce an output on a heads-up display such as a light bar.

16 Claims, 5 Drawing Sheets

GUIDANCE SYSTEM AND METHOD BASED ON DEAD RECKONING POSITIONING AND HEADING AUGMENTED BY GNSS AND PREDICTIVE PATH SELECTION

FIELD OF THE INVENTION

The present invention relates to a system and method for aiding guidance to a vehicle and particularly relates to a system and method for aiding guidance of a vehicle equipped for depositing agricultural inputs or components such as seed, fertilizer, or insecticide and the logging of amounts and locations thereof.

SUMMARY OF THE INVENTION

The invention comprises system and method for producing guidance information or cues for a vehicle and for logging agricultural input placement amounts and locations. The guidance information or data produced by the system and method can be used to aid or direct treatment of a field that has only partial or temporary access to a reliable GNSS signal. The guidance information or data can be stored in memory and output to a video display terminal or the visual display of a computing unit (e.g. laptop or user mobile phone) or alternative formatted or translated to produce an output on a heads-up display such as a light bar.

Aspects of the invention may be embodied in a system to control a flow valve and log agricultural input placement locations, the flow valve configured to receive flow valve commands. The system including a GNSS receiver adapted to output GNSS positioning data and GNSS positioning accuracy data, an inertial measurement unit adapted to output inertial measurement unit data, a vehicle speed sensor adapted to output vehicle speed data, and a processor coupled to system memory and adapted to receive the inertial measurement unit data, the vehicle speed data, the flow valve data, the GNSS positioning data, and the GNSS positioning accuracy data, and adapted to output flow valve control commands, the processor operating on program in the system memory to log the position of agricultural input placement locations with the GNSS positioning data if the GNSS positioning data satisfies GNSS positioning accuracy data value requirements, and with predicted vehicle path data comprised of a straight line fit of distances and headings that are derived from the vehicle speed data and the inertial measurement unit data, respectively, if the GNSS positioning data does not satisfy GNSS positioning accuracy data value requirements. The processor may be coupleable to the flow valve and the output flow valve control commands control the flow valve whilst logging the agricultural input placement amounts and locations. GNSS positioning accuracy data value requirements may comprise at least one calculation selected from position dilution of precision (PDOP), geometric dilution of precision (GDOP), horizontal dilution of precision (HDOP), vertical dilution or precision (VDOP), time dilution of precision (TDOP) and equivalents or alternatively or also include minimum satellite count requirements. Headings that are derived from the vehicle speed data and the inertial measurement unit data may be further comprised of a straight-line fit on GMSS positioning data obtained before receipt of GMSS positioning data that does not satisfy GNSS positioning accuracy data value requirements, or may be comprised of a lateral displacement amount programmed by a user into system memory, which lateral displacement amount reflects the distance between substantially parallel paths in a field, orchard, or worksite. The lateral displacement may be measured between a first heading and a second heading, the second heading obtained from first GNSS positioning data that meet GNSS positioning accuracy data value requirements. Alternatively, the headings may comprise a lateral displacement measured between a first heading and a second heading, the second heading substantially parallel to the first heading and obtained from first GNSS positioning data that meet GNSS positioning accuracy data value requirements.

Aspects of the invention may be embodied in a method of logging agricultural input placement amounts and locations, comprising receiving GNSS positioning data and GNSS positioning accuracy data, receiving inertial measurement unit data, receiving vehicle speed data, receiving flow meter data comprised of an agricultural input flow rate, and detecting when received GNSS positioning accuracy data meet system GNSS positioning accuracy data value requirements and if so, logging agricultural input placement amounts and locations based primarily on the received GNSS positioning accuracy data, and if not, logging agricultural input placement amounts and locations based primarily on estimating a straight line fit through headings derived from the inertial measurement unit data and distances calculated from the vehicle speed data. Estimating a straight line fit further may further comprise retrieving from system memory a prior programmed heading, and fitting a straight line comprises a fit through the prior programmed heading and the headings derived from the inertial measurement unit data and distances calculated from the vehicle speed data. Moreover, the straight line is fit through headings may be further comprised of a lateral displacement measured between a first heading and a second heading where the second heading is obtained from GNSS positioning data that meet GNSS positioning accuracy data value requirements and presumed to be substantially parallel to the first heading if it is within about 5 degrees of the first heading.

Aspects of the invention may also be implemented in a method of producing guidance cues for a vehicle, including receiving GNSS positioning data and GNSS positioning accuracy data, receiving inertial measurement unit data, receiving vehicle speed data, receiving flow meter data comprised of an agricultural input flow rate, and producing guidance cues based on (i) the received GNSS positioning accuracy data when received GNSS positioning accuracy data meet system GNSS positioning accuracy data value requirements; and otherwise supplementing the guidance cues based on (ii) estimating a straight line fit through headings derived from the inertial measurement unit data and distances calculated from the vehicle speed data. Estimating a straight line fit may further comprise, retrieving from system memory a prior programmed heading, and fitting a straight line comprises fitting a straight line through the prior programmed heading and the headings derived from the inertial measurement unit data and distances calculated from the vehicle speed data. Moreover, the straight line is fit through headings may be further comprised of a lateral displacement measured between a first heading and a second heading and the second heading is obtained from GNSS positioning data that meet GNSS positioning accuracy data value requirements and presumed to be substantially parallel to the first heading if it is within about 5 degrees of the first heading.

DESCRIPTION OF THE EMBODIMENTS

Figure 1:
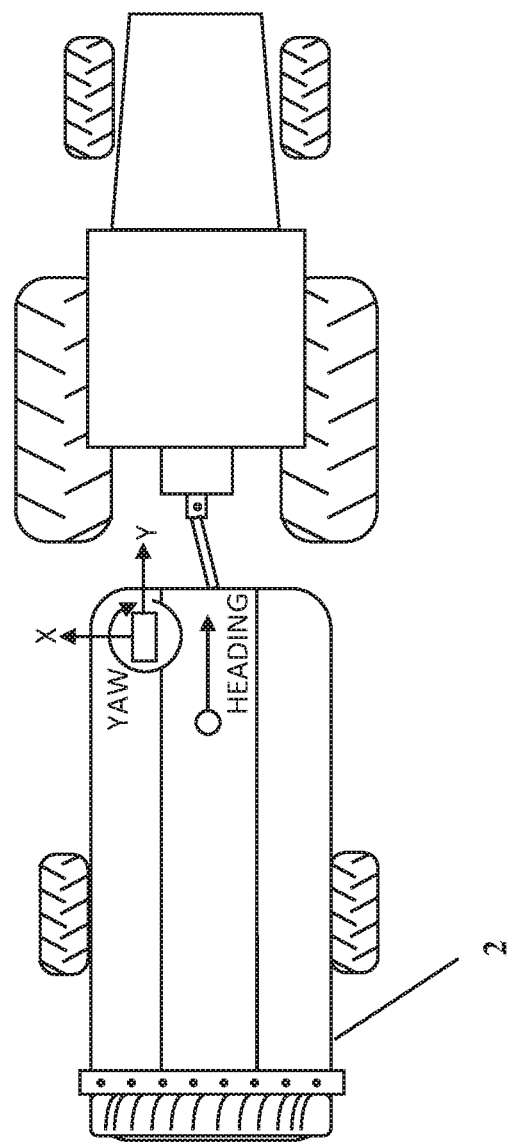
FIG. 1 illustrates a top-view or overhead illustration of a vehicle with a trailer equipped for depositing agricultural inputs, components, materials used to treat agriculture. The vehicle platform and geometry associated with the sensors is illustrated to aid in the description of the system. The two sensors represented in the illustration are the Global Navigation Satellite System subsystem ("GNSS subsystem 40") and the Inertial Measurement Unit ("IMU 30"). A GNSS antenna 42 is installed along the sprayer 2 centerline and the IMU 30 is installed square to the Y-axis.

The system described herein logs agricultural input placement amounts and agricultural input placement locations and provides guidance assistance to vehicles, including but not limited to tractors, trailers, or the like in the form of heading and positioning data to screens, displays or other guidance aids such as light bars mounted therein. An exemplary implementation of the invention described herein comprises a system for controlling agricultural equipment or vehicles used to treat fields, orchards, vineyards, or other worksites that are intended to receive one or more agricultural inputs or components such as seed, fertilizer, or insecticide, etc. FIG. 1 for example illustrates a tractor pulling a trailer configured as a sprayer 2 that is equipped with hardware and software embodying a system according to the description herein. The sprayer 2 includes a reservoir holding an agricultural input, which release and rate of release is regulated and monitored by a flow valve 70 and flow meter 72, respectively, as the sprayer 2 is guided or directed through or across a field, orchard, or worksite to deposit the agricultural input. The flow meter 72 outputs flow meter data 74 to the controller 10 for logging the rate of output of the agricultural input. Finally, despite that a sprayer 2 is illustrated and described herein, it would be within the knowledge of one of ordinary skill to modify the teachings herein for alternative vehicles or agricultural equipment.

Figure 2:
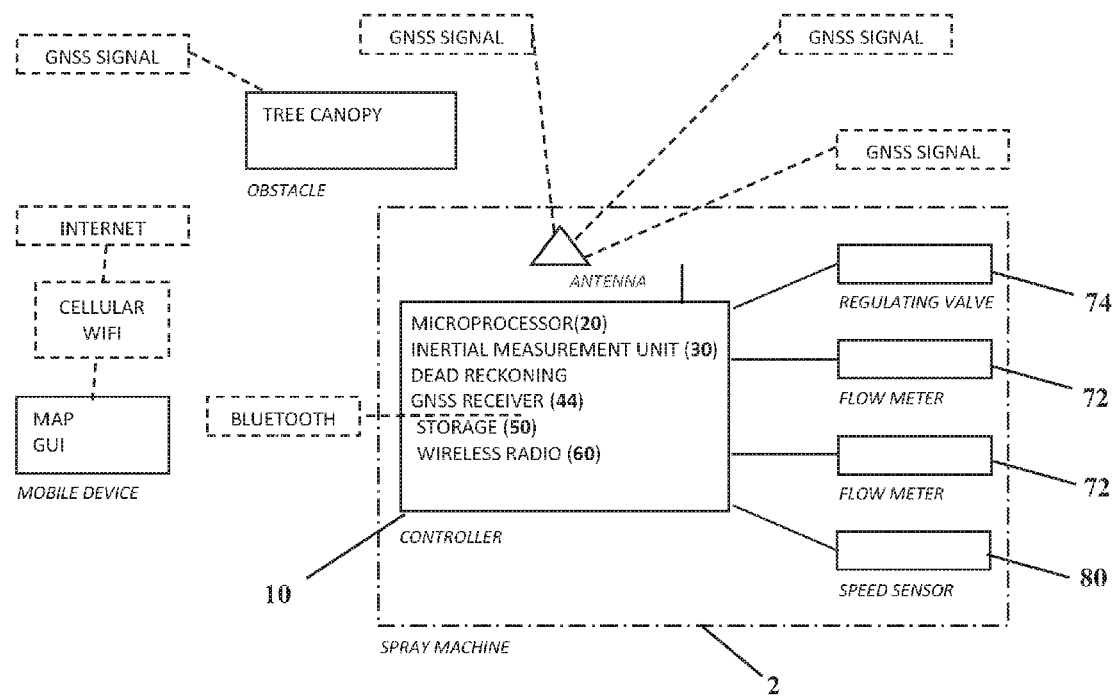
FIG. 2 illustrates a block diagram of an embodiment. System components are included and the interrelation between the components or subsystems is illustrated with dotted lines for wireless or radio signals and solid lines for electrical/digital signals carried by electrical conductors such as metal traces, cabling, or wiring. A dot-dash line surrounds the elements attached to the spray machine. In the illustrated example or embodiment. The system uses the GNSS positioning data 44 to determine the system heading when GNSS position fix is valid and the sprayer 2 is in motion. The IMU 30 provides yaw measurement for use in calculating vehicle path data when GNSS positioning data 44 is unavailable or fails to satisfy system GNSS positioning accuracy data value requirements.

FIG. 2 further illustrates the context of an intended system use and a preferred system architecture. A preferred system embodiment comprises a controller 10 that includes a system computer processor, microcontroller, or microprocessor (generally referred to herein as a "processor 20") functionally coupled to an inertial measurement unit (IMU) 30 and GNSS subsystem 40, system memory 50, and a wireless radio 60. The controller 10 is functionally coupleable to additional subsystems or components on the sprayer 2 that provide or obtain data from the controller 10 and aid in the implementation of processes described herein. In the example, the additional subsystems or components include at least one flow meter 72 that provides real time flow rate data to the controller 10, a regulating valve 74 receives outputs from the controller 10 to regulate the release rate of the agricultural input contained within the reservoir, and a vehicle speed sensor 80 (e.g. wheel speed sensor) that provides vehicle speed data used by the controller 10 to calculate distances or locations when GNSS positioning data 44 is unreliable. Moreover, a user interface, which may be by hardwired or wireless communications over the wireless radio 60, facilitates the communication of commands to, and data from, the controller 10 from a user devices such as a smart phone, tablet or personal computer.

The controller 10 and software processes described herein may be implemented within a system in a single housing with inputs and outputs that connect the additional subsystems or components described, or the hardware and software system may be distributed across several housings that are functionally coupled by inputs and outputs by one or more communications protocols. The system described may be used to control the rate at which agricultural inputs are deposited; log the location and amount or rate at which agricultural inputs are deposited; and generate guidance information used while depositing the agricultural input. The controller 10 obtains or generates heading and positioning data for guidance or logging despite the absence of reliable GNSS signals, which is of particular utility when treating a worksite that may experience temporary loss of access to GNSS signals. The system described herein relies on inputs from GNSS subsystem 40 for heading and positioning data when GNSS signals are available and reliable, and the IMU 30 and a vehicle speed sensor 80 for headings and distances, respectively, and on Snap Mode processes when GNSS signals are not available or not reliable.

The system processor 20 is coupled to electronic memory that stores computer code that implements start-up, executive control operations, and one or more processes that calculate and log positioning and heading while depositing agricultural inputs to a worksite. The preferred embodiment provides positioning and logging in at least two, but preferably three, operating modes that are each operable depending on the reliability or quality of GNSS positioning accuracy data received from the GNSS subsystem 40. The first mode, GNSS Mode is characterized by the controller 10 receiving GNSS signals from the GNSS subsystem 40 that meet system GNSS positioning accuracy data value requirements. In GNSS Mode the controller 10 relies on the GNSS subsystem 40 which outputs positioning and heading guidance data or PVT (e.g. Position, Velocity, Time) data that can be used by the controller 10 to both generate guidance control outputs (e.g. to a heads up display, light bar, or a user device) and to record or log the agricultural input placement locations and amounts.

A second mode Dead Reckoning (DR) Mode is triggered by the controller 10 receiving GNSS signals from the GNSS subsystem 40 that fail to meet minimum system GNSS positioning accuracy data value requirements. In DR Mode, the controller 10 generates headings based on IMU data 32 that the IMU 30 obtains from one or more sensors, such as an accelerometer and/or a gyroscope, and distances calculated from the vehicle speed sensor 80. A third mode is predicted vehicle path mode (also referred to herein as "Snap Mode"), can augment or be used as an alternative to DR Mode, if predicted vehicle path data is present in system memory or is at least temporarily or intermittently available. In GNSS Mode, the controller 10 weights GNSS positioning data is greater than the IMU data 32 and in DR Mode, the controller 10 weights controller 10 generated heading and positioning data greater than GNSS positioning data 44. In Snap Mode, the controller 10 weights predictive predicted vehicle path data greater than either GNSS positioning data 44 or DR Mode generated heading and positioning data.

The GNSS subsystem 40 is functionally coupled to GNSS signals by a GNSS antenna 42, which the GNSS subsystem 40 uses to generate GNSS positioning data 44 and GNSS positioning accuracy data 46 that is output to the controller 10. The controller 10 relies on GNSS signals to establish heading and positioning of the sprayer 2 while in GNSS Mode. During GNSS Mode, the controller 10 obtains GNSS positioning data 44 data from the GNSS subsystem 40 and uses the GNSS positioning data 44 to generate guidance display output for the sprayer 2 and/or to log discreet agricultural input placement amounts and locations. The controller 10 also uses last known reliable GNSS positioning data 44 before entering DR Mode or Snap Mode calculations. Finally, the controller 10 may initiate storage of GNSS positioning data 44 to memory based on a command input to the controller 10 from a vehicle driver communicated by wired or wireless communication to the controller 10 such as by wireless communication from an application resident on a user device that is functionally coupled to the controller 10 wireless radio 60 (e.g. Bluetooth®) and operated by the user.

For optimal GNSS subsystem 40 performance, the GNSS antenna 42 is preferably located on or at the sprayer 2 centerline. The IMU 30 can be located of the sprayer 2 centerline provided that it is square to the Y-Axis or forward direction and/or otherwise corrected or calibrated. The controller 10 relies on GNSS positioning data 44 for guidance and logging unless GNSS signals are unreliable or unavailable, such as the case when one or more GNSS satellites are temporarily blocked or obstructed. In such cases the controller 10 detects the receipt of GNSS positioning data 44 that fails to meet system GNSS positioning accuracy data value requirements and changes system state and generates heading and positioning data either via DR Mode or via predictive vehicle path mode/Snap Mode. In one embodiment of DR Mode, the IMU 30 provides IMU data 32, or alternatively, the controller 10 samples IMU data 32, at a distinct time interval, $t_n$, to determine DR Mode headings e.g. $H_{r0}$, $H_{r1}$, $H_{r2}$, . . . etc., and samples vehicle speed data from the vehicle speed sensor 80 to determine the incremental distances traveled between DR Mode headings. Moreover, given a known starting latitude and longitude (i.e. a position obtained from unobstructed or valid and reliable GNSS positioning data 44 that meets GNSS positioning accuracy data value requirements), the instantaneous latitude and longitude for the sprayer 2 can be estimated based on the combination of DR Mode headings and incremental distances traveled. Finally, the instantaneous positioning during loss of GNSS signals may be further augmented by predicted vehicle path mode ("Snap Mode"), which augments positioning based on the prior knowledge of GNSS positioning data 44 for a worksite stored in memory or the ability to obtain or learn information about the worksite based on temporary or intermittent access to GNSS positioning data 44 that meets GNSS positioning accuracy data value requirements.

Figure 3:
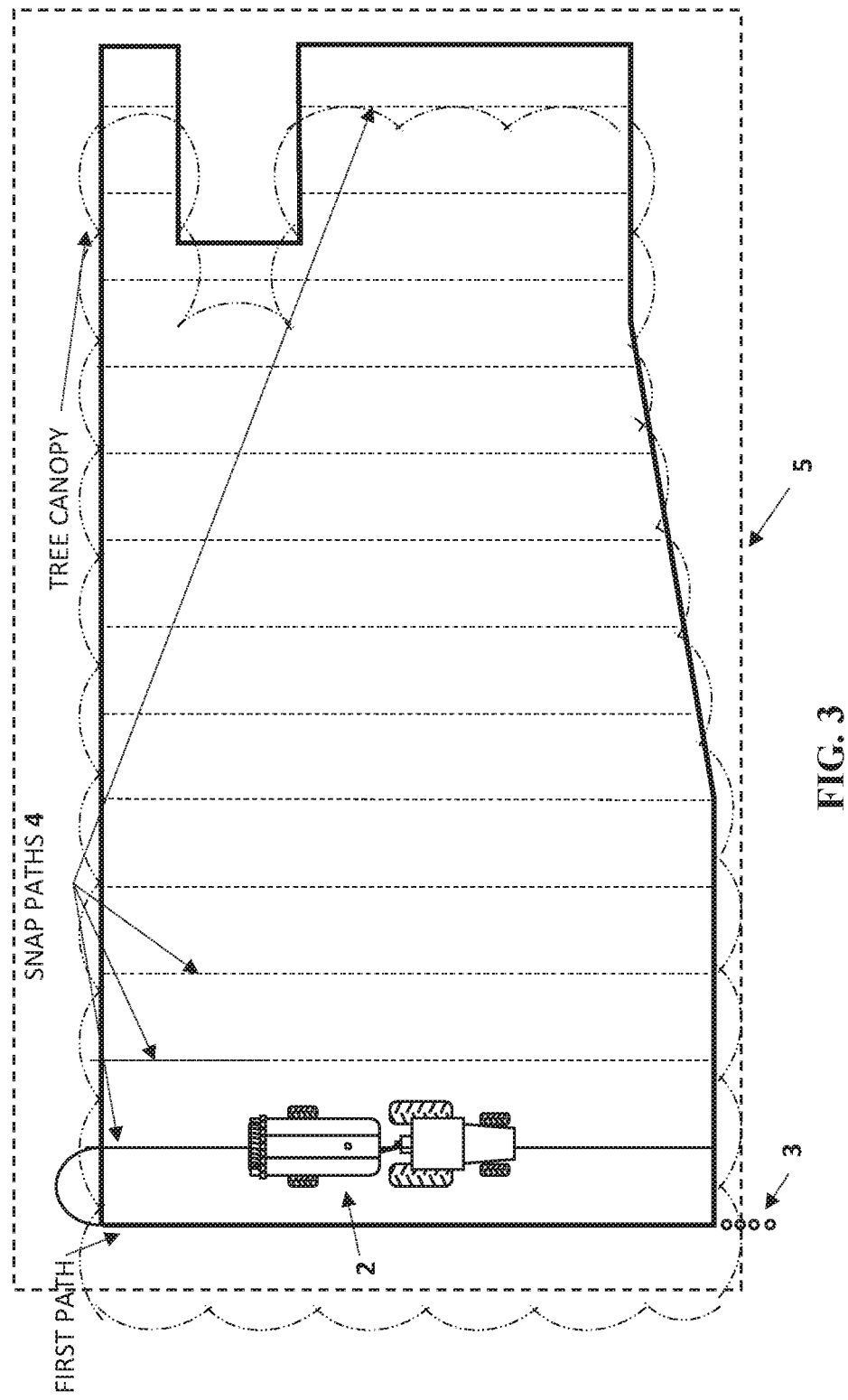
FIG. 3 illustrates variations in an orchard shape that can make up the typical orchard. There are angle boundary lines and cutouts and trees are typically planted in evenly spaced, parallel rows. In an exemplary application of the embodiment, a vehicle such as a sprayer 2 equipped with the system and as aided by the system outputs is steered or guided to travel between the evenly spaced, parallel rows to apply agricultural inputs. In the illustration the tree canopy covers at most all the orchard boundary but does not extend far outside this boundary allowing open sky for the GNSS sensor mounted on the spray machine to acquire valid position during turns to the next spray path. The dotted lines indicate vehicle paths 4 used in Snap Mode based on average path heading and average distance between vehicle paths 4.

As one example, the worksite may comprise an orchard as in FIG. 3. The controller 10 may store to, or have stored GNSS positioning data 44 in, memory based on temporary or intermittent access to, or prior receipt of, GNSS positioning data 44 comprising one or more latitude and longitude waypoints that substantially correspond to GNSS positioning data 44 associated with the orchard. As one example, the GNSS positioning data 44 stored in system memory may comprise a set or collection of latitude and longitude waypoints that correspond to a latitude and longitude waypoint perimeter 5 around the orchard. One or more system processes such as the logging of vehicle positions and flow rates may be initiated by detection of the latitude and longitude waypoint perimeter 5 may trigger, or such processes may be initiated by user command, or by receipt of flow meter data 74 indicating that an agricultural input is being released. As a further example, the controller 10 may also initiate storage of GNSS positioning data 44 based on receipt of latitude and longitude waypoints that correspond to a substantially straight vehicle path, and subsequent communication between the flow valve 70 and controller 10 that an agricultural input is being released.

A substantially straight vehicle path corresponds with the receipt of GNSS positioning data 44 comprised of waypoints that correspond with parameters within system programming that the controller 10 uses to detect substantially straight vehicle paths or headings. As illustrated in FIG. 3, the sprayer 2 may approach the orchard with a substantially straight vehicle path or GNSS heading, which may be determined as is known in the art by measuring the phase difference of a GNSS signal measured between two antennas of the GNSS subsystem 40 or by comparison of consecutively received or sampled position data obtained from the GNSS subsystem 40 having the same heading or comprising the receipt of a plurality, set, or series of waypoints that have the substantially the same heading 3 wherein substantially the same heading may comprise consecutive headings that are within a range of no more than about three about three to five degrees of each other. Moreover, the system parameters comprising the waypoints with substantially the same headings 3 may also require worksite adjacent proximity or be within the previously described latitude and longitude waypoint perimeter 5 of the orchard, or alternatively coincide with receipt by the controller 10 of flow meter data 74 indicating that an agricultural input is being released.

An example of the controller 10 detection of substantially straight vehicle paths or headings 3 is illustrated in FIG. 3. In the example, the worksite is an orchard with canopy that may temporarily or intermittently block system access to GNSS signals. As the sprayer 2 approaches the orchard it is in GNSS Mode as it is outside of the canopy and therefore in receipt of GNSS signals that meet system GNSS positioning accuracy data value requirements. The controller 10 will remain in GNSS mode provided that it continues to receive GNSS signals that meet system GNSS positioning accuracy data value requirements. Moreover, upon receipt of a set of waypoints having substantially the same headings 3 the controller 10 will have sufficient information to enter DR Mode. As the sprayer 2 enters under the canopy, the controller 10 will detect the receipt of GNSS signals that fail to meet minimum GNSS positioning accuracy data values and enter DR Mode. In DR Mode, the controller 10 will use the last known heading from GNSS Mode and use IMU data 32 to calculate predicted vehicle path data comprised of a straight line on or through the orchard, which predicted vehicle path data can be used by the controller 10 to generate display output data to guide the sprayer 2 driver and to log agricultural input placement amounts and locations through the orchard. When the sprayer 2 exits the orchard the controller 10 may again reacquire GNSS signals and/or on subsequent vehicle paths through the orchard, enter Snap Mode.

Figure 5:
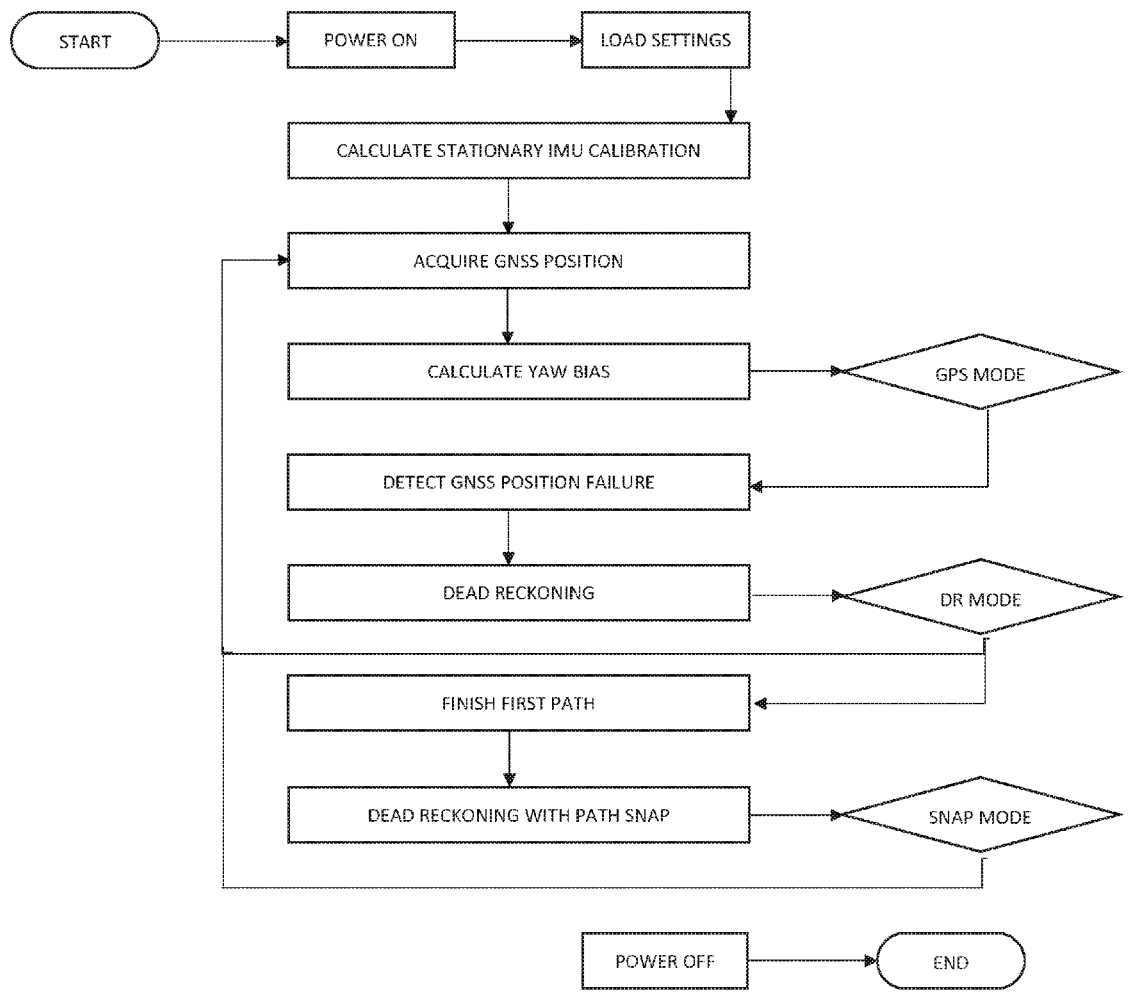
FIG. 5 illustrates a flowchart including the system methods or processes to calculate a relatively accurate position during system operation to aid in guidance such as use occurring for a system implementation, such as for, but not limited to, an orchard spraying operation. Positioning is provided by one of three calculation modes 1) GNSS Mode 2) DR Mode 3) Snap Mode.

FIG. 5 comprises an embodiment of an operational system flow or system state machine coded into system programming that illustrates how the system described herein adjusts to or reacts to the effects of environmental or other external conditions that eliminate or limit the availability of adequate GNSS signals to ensure accurate sprayer 2 positioning and heading determinations. Data inputs obtained from other system components such as the GNSS subsystem 40 and the IMU 30 are written to system memory and accessed by the processor 20 to enable state transitions as determined by detected conditions and system programing. The illustrated state machine discloses a preferred flow and specified system states but it is contemplated that a person of ordinary skill could use the teachings herein to modify or create an alternative system flow diagram or state machine that incorporate aspects disclosed herein.

Executive system operations begin at system power-up. The processor 20 accesses system memory to load system settings and execute preferred start-up processes prior to advancing to an operational system state that produces guidance headings and positions that are useful to aid in directing a vehicle equipped with a system as described herein. In the preferred embodiment, and after the system has powered on and the user settings have been loaded from persistent memory, the system programming initiates a timer to allow the IMU 30 subsystem to complete start-up procedures such as calibration of the IMU 30 to determine the IMU Yaw. For example, in certain embodiments, the IMU 30 self-calibrates only while stationary, which the system programming may confirm by obtaining data from a vehicle speed sensor 80 to calculate a vehicle speed. System algorithms or programming allows sufficient time allowed for IMU Yaw calibration. The system programming verifies the existence of zero vehicle speed for enough time to allow the IMU module to complete self-calibration procedures. As an example, the vehicle speed must be zero for at least twenty (20) straight seconds to allow the IMU 30 to complete self-calibration procedures.

After IMU 30 start-up procedures and self-calibration are completed, the state machine coded into system programming performs yaw bias calibration. Yaw bias calibration requires constant valid GNSS positions and vehicle speed above 0.25 meters per second, which inputs are provided by the GNSS subsystem 40 and a vehicle speed sensor 80, respectively. If and while these conditions are satisfied, the system programming smooths the IMU 30 reported yaw and the GNSS reported heading with low pass filters. Yaw bias is the inherent heading error of the IMU 30, which can be determined by assuming the GNSS reported heading is accurate and calculating the difference or error in heading reported by the IMU. The system can then correct heading calculations and correct for yaw bias when GNSS signals are unreliable or unavailable.

A procedure for determining yaw bias is as follows. For each new heading value of each measurement calculate the change from the previous heading value. Because the yaw and heading measurements wrap between 0 and 360, it is necessary to check if the delta is >180 or <−180. If so, subtract 360 or add 360, respectively. This gives an accurate number of degrees change. For example:

| Heading | Difference |
|---|---|
| first heading: 0 | difference: not applicable |
| new heading: 5 | difference: 5 |
| new heading: 7 | difference: 2 |
| new heading: 4 | difference: −3 |
| new heading: 2 | difference: −2 |
| new heading: 358 | difference: 356 (>180 so subtract 360 = −4) |
| new heading: 356 | difference: −2 |
| new heading: 3 | difference: −353 (<−180 so add 360 = 7) |
| new heading: 10 | difference: 7 |

The difference or change is added to a running total for a value of yaw and heading in relation to the first value read but now without wrapping. Yaw bias is determined by calculating the difference between the unwrapped yaw and heading. Over time, this difference will be fairly constant but changes slightly during rate of turn changes, temperature variations and inherent measurement lag between the distinct modules of the IMU 30 and the GNSS subsystem 40. This yaw bias is calculated with a rolling average of 20 seconds. A more accurate yaw bias is then searched for by recognizing motion along a straight line. The motion is considered straight when the standard deviation of yaw is less than a few degrees over 10 seconds. If this condition is found the yaw bias calculated from these 10 seconds is used in preference to the former. Yaw bias can be updated throughout time as desired by repeating the calculation procedure.

After system start-up and calibration of system components, the system programming advances to a system state that outputs GNSS positioning data 44 to aid in guidance of a vehicle equipped with the system. In the preferred embodiment, the system outputs GNSS positioning data 44 according to a weighted or hierarchical order wherein the preferred order is heading and positioning based on GNSS positioning data 44, dead reckoning positioning based on inertial measurement unit data from vehicle speed sensor 80 inputs and system calculations, or predictive positioning and heading based on predicted vehicle path or Snap data.

Figure 4:
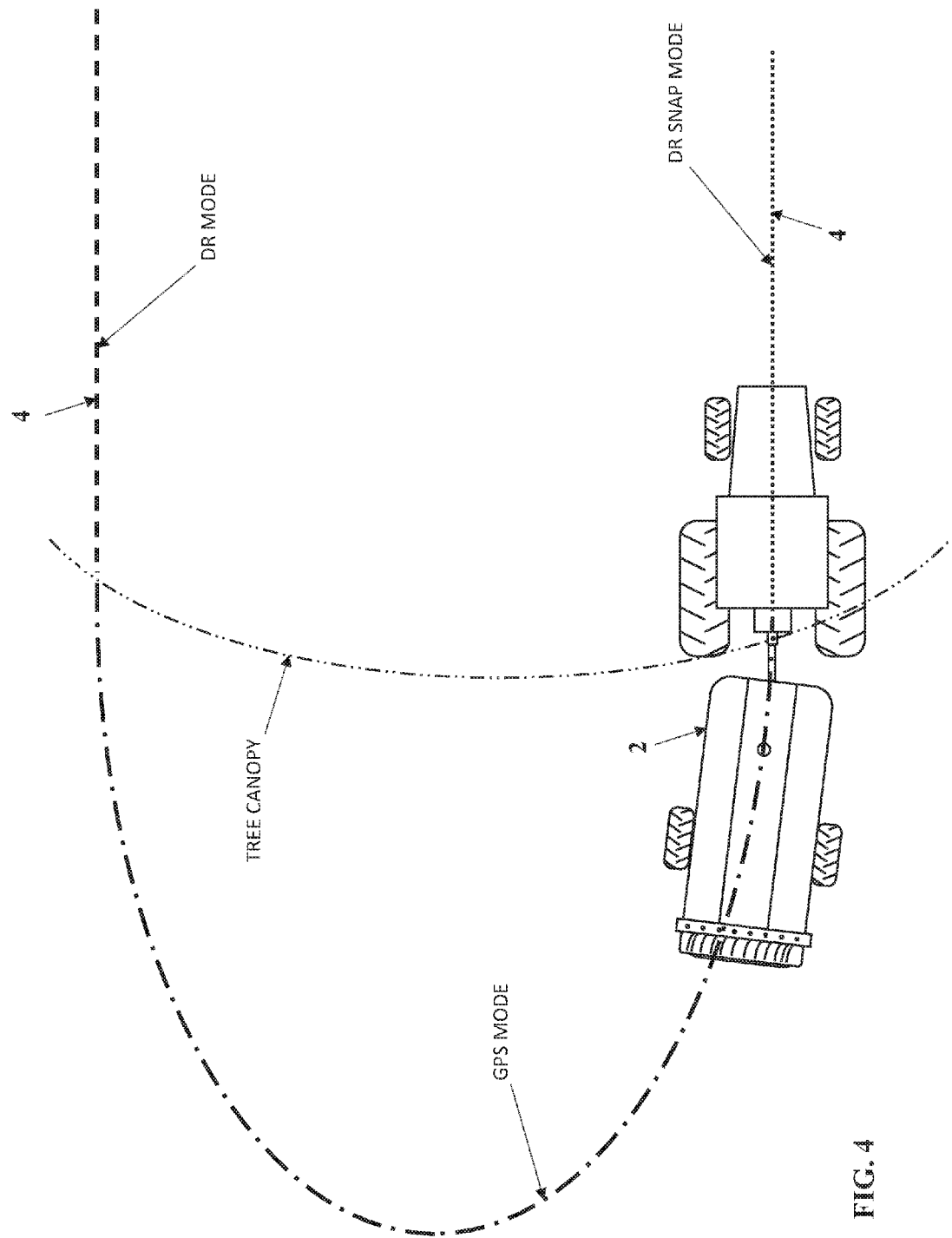
FIG. 4 illustrates the point along the vehicle paths 4 where system mode changes between DR Mode, GNSS Mode, and DR SNAP Mode. DR Mode is used on the first path where valid or reliable GNSS positioning data 44 is missing due to the tree canopy blocking GNSS signal acquisition. Subsequent vehicle paths 4 will use predictive heading selection or Snap Mode with the exception of the case where the user provides or inputs sufficient information to override the system produced Snap heading or if the user does not provide the path spacing as described in Snap Mode above.

GNSS Mode uses the position calculated by GNSS positioning data 44 received from the GNSS subsystem 40. GNSS Mode is operable when a vehicle equipped like the sprayer 2 can access reliable and unobstructed GNSS signals that meet system GNSS positioning accuracy data value requirements such as when the vehicle is away from worksite obstructions. Moreover, it is common that the controller 10 switch back and forth from operating modes based on detection of GNSS signals that meet or do not meet system GNSS positioning accuracy data value requirements. Such conditions are common at certain worksites such as orchards entering and exiting the orchard in a series of turns that allow the machine to navigate from one straight row through the orchard to the next. See FIG. 4. This, minimally, will be in the shape of a U-turn; however, often a spray machine or other vehicle may skip one or more rows in order to make a wider turn radius, which allows more time in GNSS Mode.

A preferred implementation of dead reckoning or DR Mode uses a position calculated by integrating vectors composed of the calculated heading direction and of length as calculated by the vehicle speed sensor 80. The heading direction is the yaw measurement from the IMU 30 after a low pass filter plus a correction to account for the yaw bias. The length is calculated by dividing the wheel sensor speed by the time between measurements. The wheel sensor calculates speed by measuring the time between pulses obtained from a sensor capable of sensing or detecting a ferrous material passing in front of the sensor. For a sprayer 2 vehicle, this sensor is positioned in front of the lug bolts on a wheel, which should must be regularly spaced or corrected for in system programming. As one example, a user enters the distance the vehicle travels over one complete rotation of the wheel and also the number of lugs that pass in front of the sensor during this rotation.

The controller 10 initiates DR Mode integration upon receipt of GNSS signals that fail to meet minimum GNSS positioning accuracy data values. In a preferred embodiment, GNSS positioning accuracy data value requirements comprise a PDOP greater than 1.0 or a Satellite count less than 5. Additionally, the controller 10 may also enter DR Mode upon receipt of GNSS positioning data 44 that indicates a sudden jump in position as calculated by measuring the distance between sequential positions one (1) second apart that corresponds to a speed greater than that possible in a vehicle. The gyroscope and accelerometer sensors of the IMU 30 provide heading after filter calculations and calibration, which may have error attributed to gyro drift, high G vibrations and temperature changes. Moreover, because DR Mode produces positions that are not of sufficient accuracy after some time in use, the controller 10 will revert to GNSS Mode upon receipt of GNSS positioning data 44 that meets GNSS positioning accuracy data value requirements, or the controller 10 may enter Snap Mode.

Predictive vehicle path mode or Snap Mode guidance comprises the system programming comparing data in system memory and looking for repeating patterns of vehicle travel such as reading and recognizing a pattern of motion along equidistant or parallel paths. The system also enables additional use of dead reckoning guidance to limit heading error drift to produce exceptional positioning results. In Snap Mode, the system programming calculates positioning in the same manner that DR Mode calculates positioning i.e. using the same vehicle speed sensor 80 distance data as in DR Mode. Heading however, is determined by analyzing and detecting patterns between a current heading and one driven on one or more previous path(s) through the field or orchard. System algorithms predict the desired path by recognizing the pattern in heading of these parallel lines and the distance between them. By combining the wheel speed distance and snapping the heading to the known pattern, a more accurate position is calculated that does not succumb to drift, vibration or temperature.

In a preferred embodiment, at least one straight path must be recorded in GNSS Mode or DR Mode, or a heading and distance between paths is provided by the user for Snap Mode. A user may enter a prior programmed path or prior programmed heading into system memory by input from a user device wireless coupled to the controller 10. Alternatively, if the user does not provide a heading or distance between paths, Snap Mode will be entered after two parallel paths are detected wherein the heading will be calculated to be the average of their calculated headings. If the user provides the prior programmed Snap heading, Snap Mode will be entered into immediately upon losing valid GNSS position fix without requiring any previous paths to have been driven. Straight lines are expected while spraying based upon an assumption that paths in orchards are arranged in parallel rows. So, while spray is detected by the flow meter 72, the standard deviation is calculated on DR Mode heading and if less than a few degrees, the path is considered straight. Then a straight line is fit through all the DR Mode heading values since the first position in the straight data. Calculation is stopped if the spray stops being detected or if the standard deviation grows larger than a few degrees. The slope of the best fit line is calculated and normalized to degrees 0 to 360. There must be 10 meters between start and stop of best fit data. Multiple lines are considered parallel if the standard deviation or in the case of just 2 or 3 lines the average difference, is less than a few degrees. Moreover, the distance between parallel lines is calculated and cataloged and the distance between parallel lines may be presumed to be multiples of the same value. It is also expected that every line will be sprayed so by examining the catalog of distances between lines, it is discoverable if there are missing lines. Also, it is possible to predict the next line and display guidance to that line in terms of distance and bearing from the user's current motion. As new parallel lines are detected, they are compared to the catalog and determined if they fit the field or not. If they do not match the pattern, then a new pattern is cataloged. Finally, DR Mode and Snap Mode both return to GNSS Mode when the GNSS position fix is valid.

The system stores all system heading and position data and all variables representing the use of the system to control agricultural equipment. For example, the system stores all information related to the amount of agricultural components spread or sprayed and the heading and position related to when the components were spread or sprayed. The agricultural information or data is subsequently transferred to a computing device via a wired or wireless communications link for storage of said agricultural information or subsequent conveyance or transmission to another remote computing device or server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A system to control a flow valve and log agricultural input placement locations, the flow valve configured to receive flow valve commands, comprising:
   a GNSS receiver adapted to output GNSS positioning data and GNSS positioning accuracy data;
   an inertial measurement unit adapted to output inertial measurement unit data;
   a flow meter adapted to output flow meter data;
   a vehicle speed sensor adapted to output vehicle speed data; and
   a processor coupled to system memory and adapted to receive the inertial measurement unit data, the vehicle speed data, the flow meter data, the GNSS positioning data, and the GNSS positioning accuracy data, and adapted to output flow valve control commands to control the flow valve, the processor operating on a program in the system memory to log the position of agricultural input placement locations based (i) on the GNSS positioning data if the GNSS positioning data satisfies GNSS positioning accuracy data value requirements, and (ii) on predicted vehicle path data comprised of a straight line fit of headings derived from a known lateral displacement between a first heading and a second heading that is substantially parallel to the first heading if the GNSS positioning data does not satisfy GNSS positioning accuracy data value requirements, respectively.

2. The system in claim 1 wherein,
the GNSS positioning accuracy data value requirements comprise at least one calculation selected from position dilution of precision (PDOP), geometric dilution of precision (GDOP), horizontal dilution of precision (HDOP), vertical dilution of precision (VDOP), time dilution of precision (TDOP).

3. The system in claim 2 wherein,
the GNSS position accuracy data comprises a PDOP of less than about 1.0.

4. The system in claim 3 wherein,
the GNSS positioning accuracy data value requirements comprises position dilution of precision (PDOP) calculations and a minimum GNSS positioning accuracy data value requirement comprises a satellite count of greater than 5.

5. The system in claim 1 wherein,
the headings are further derived from vehicle speed data and inertial measurement unit data and a straight-line fit on GNSS positioning data obtained before receipt of GNSS positioning data that does not satisfy GNSS positioning accuracy data value requirements.

6. The system in claim 5 wherein,
the inertial measurement unit data is comprised of yaw data.

7. The system in claim 1 wherein,
the headings further comprise a lateral displacement amount programmed into system memory.

8. The system in claim 1 wherein,
the first heading is obtained from second GNSS positioning data that meet GNSS positioning accuracy data value requirements.

9. The system in claim 8 wherein,
the second heading is considered substantially parallel to the first heading if it is within about 5 degrees of the first heading.

10. A method of logging agricultural input placement amounts and locations, comprising:
receiving GNSS positioning data and GNSS positioning accuracy data, inertial measurement unit data, vehicle speed data, and flow meter data comprised of an agricultural input flow rate to a controller;
detecting when received GNSS positioning accuracy data meet system GNSS positioning accuracy data value requirements and if so, logging agricultural input placement amounts and locations based primarily on the received GNSS positioning data, and if not, logging agricultural input placement amounts and locations based primarily on a lateral displacement between a first heading and a second heading, the second heading substantially parallel to the first heading that is obtained from GNSS positioning data that meet GNSS positioning accuracy data value requirements.

11. The method in 10 wherein,
the second heading is further derived by estimating a straight line fit by retrieving from system memory a prior programmed heading, and fitting a straight line through the prior programmed heading and the headings derived from the inertial measurement unit data and distances calculated from the vehicle speed data.

12. The method in 10 wherein,
the second heading is further derived by estimating a straight line is fit through headings created from a lateral displacement measured between the first heading and the second heading.

13. The method in 12 wherein,
the second heading is considered substantially parallel to the first heading if it is within about 5 degrees of the first heading.

14. A method of producing guidance cues for a vehicle, comprising:
receiving GNSS positioning data and GNSS positioning accuracy data;
receiving inertial measurement unit data;
receiving vehicle speed data;
receiving flow meter data comprised of an agricultural input flow rate; and
displaying distance and bearing guidance cues to a third vehicle path based on (i) the received GNSS positioning data when received GNSS positioning accuracy data meet system GNSS positioning accuracy data value requirements; and supplementing the guidance cues based on (ii) estimating a straight line fit through headings derived from a lateral displacement between a first vehicle path and a second vehicle path.

15. The method in 14 wherein,
estimating a straight line fit further comprises, retrieving from system memory a prior programmed heading, and fitting a straight line comprises fitting a straight line through the prior programmed heading and the headings derived from the inertial measurement unit data and distances calculated from the vehicle speed data.

16. The method in claim 14 wherein,
the lateral displacement is derived from GNSS positioning data that meet GNSS positioning accuracy data value requirements.

* * * * *